(12) United States Patent
Harada et al.

(10) Patent No.: US 7,720,380 B2
(45) Date of Patent: May 18, 2010

(54) OPTICAL TRANSMISSION APPARATUS IN RING TRANSMISSION SYSTEM

(75) Inventors: Tomoyuki Harada, Kawasaki (JP); Naokatsu Ohkawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/709,458

(22) Filed: Feb. 22, 2007

(65) Prior Publication Data
US 2007/0172238 A1  Jul. 26, 2007

Related U.S. Application Data

(63) Continuation of application No. PCT/JP2004/014324, filed on Sep. 30, 2004.

(51) Int. Cl.
*H04B 10/20* (2006.01)
*H04J 14/02* (2006.01)

(52) U.S. Cl. .......................... 398/59; 398/83

(58) Field of Classification Search ............. 398/5, 398/59, 83, 58
See application file for complete search history.

(56) References Cited

U.S. PATENT DOCUMENTS 6,476,945 B1 * 11/2002 Archambault ............ 398/59

2002/0024931 A1  2/2002  Chikazawa et al.

FOREIGN PATENT DOCUMENTS

| JP | 8-288963    | 11/1996 |
| JP | 2001-197011 | 7/2001  |
| JP | 2002-77208  | 3/2002  |
| JP | 2002-141924 | 5/2002  |
| JP | 2003-224571 | 8/2003  |

OTHER PUBLICATIONS

International Search Report dated Jan. 18, 2005.

* cited by examiner

*Primary Examiner*—Quan-Zhen Wang
(74) *Attorney, Agent, or Firm*—Katten Muchin Rosenman LLP (57) ABSTRACT

To provide a node (an optical transmission apparatus) enabling expanding the upper limit of the number of nodes capable of automatically forming a squelch table generated in advance in a BLSR system. For the above purpose, when generating a squelch table, hop counts counted from an add node or a drop node are used in place of a node ID of the own, as information of the add node, the drop node, etc. to be transmitted and received using a squelch data link. Thus, it becomes unnecessary to transmit and receive two information sets, a source node ID and a destination node ID, as conventionally required. By this, the number of bits available for identifying nodes can be expanded, enabling expansion of the number of nodes for which a squelch table can be formed automatically.

5 Claims, 9 Drawing Sheets

FIG. 1A

PRIOR ART

FIG. 1B

PRIOR ART

FIG. 2

| E→W direction | | | | W→E direction | | | |
|---|---|---|---|---|---|---|---|
| East side | | West side | | East side | | West side | |
| Add node | Drop node | Add node | Drop node | Add node | Drop node | Add node | Drop node |

PRIOR ART

FIG. 3A

| E→W direction | | | | W→E direction | | | |
|---|---|---|---|---|---|---|---|
| East side | | West side | | East side | | West side | |
| − | − | − | − | 2 | 4 | − | − |

PRIOR ART

FIG. 3B

| E→W direction | | | | W→E direction | | | |
|---|---|---|---|---|---|---|---|
| East side | | West side | | East side | | West side | |
| − | − | − | − | 2 | 4 | 2 | 4 |

PRIOR ART

FIG. 3C

| E→W direction | | | | W→E direction | | | |
|---|---|---|---|---|---|---|---|
| East side | | West side | | East side | | West side | |
| − | − | − | − | − | − | 2 | 4 |

PRIOR ART

FIG. 4

Transmission in the East direction     Transmission in the West direction

| E→W direction SRC_ID | E→W direction DST_ID | E→W direction SRC_ID | E→W direction DST_ID |
|---|---|---|---|
| W→E direction DST_ID | W→E direction SRC_ID | W→E direction DST_ID | W→E direction SRC_ID |

Reception in the East direction     Reception in the West direction

| E→W direction SRC_ID | E→W direction DST_ID | E→W direction SRC_ID | E→W direction DST_ID |
|---|---|---|---|
| W→E direction DST_ID | W→E direction SRC_ID | W→E direction DST_ID | W→E direction SRC_ID |

SRC_ID: Source (Add) ID
DST_ID: Destination (Drop) ID

PRIOR ART

FIG. 5

PRIOR ART

FIG. 6A

PRIOR ART

FIG. 6B

PRIOR ART

FIG. 6C

PRIOR ART

FIG. 7

|  | East side | | West side | |
|---|---|---|---|---|
|  | Upper digit<br>D7 D6 D5 D4 | Lower digit<br>D3 D2 D1 D0 | Upper digit<br>D7 D6 D5 D4 | Lower digit<br>D3 D2 D1 D0 |
| E→W direction | SRC ID | DST ID | SRC ID | DST ID |
|  | Upper digit<br>D7 D6 D5 D4 | Lower digit<br>D3 D2 D1 D0 | Upper digit<br>D7 D6 D5 D4 | Lower digit<br>D3 D2 D1 D0 |
| W→E direction | SRC ID | DST ID | SRC ID | DST ID |

PRIOR ART

FIG. 8

Transmission in the East direction

| Hop count in the E→W direction | DCP | DTP |
|---|---|---|
| Hop count in the W→E direction | DCP | DTP |

Transmission in the West direction

| Hop count in the E→W direction | DCP | DTP |
|---|---|---|
| Hop count in the W→E direction | DCP | DTP |

Reception in the East direction

| Hop count in the E→W direction | DCP | DTP |
|---|---|---|
| Hop count in the W→E direction | DCP | DTP |

Reception in the West direction

| Hop count in the E→W direction | DCP | DTP |
|---|---|---|
| Hop count in the W→E direction | DCP | DTP |

FIG. 9A

East side
Upper digit   Lower digit
D7 D6 D5 D4 D3 D2 D1 D0

E→W direction | Hop count | DCP | DTP |

West side
Upper digit   Lower digit
D7 D6 D5 D4 D3 D2 D1 D0

| Hop count | DCP | DTP |

Upper digit   Lower digit
D7 D6 D5 D4 D3 D2 D1 D0

W→E direction | Hop count | DCP | DTP |

Upper digit   Lower digit
D7 D6 D5 D4 D3 D2 D1 D0

| Hop count | DCP | DTP |

FIG. 9B

| Bit | value | Description |
|---|---|---|
| D0: | 0 Other than DTP<br>1 DTP | Indicating whether the transmission/reception data link value is a hop count of the DCP primary node or secondary criterion. |
| D1: | 0 Other than DCP<br>1 DCP | Indicating whether the transmission/reception data link value is a hop count of the DCP primary node criterion. |
| D2–D7 | 0–63 | Hop count from SRC node or DST node (Span count).<br>※0 = Initial value. |

| E→W direction | | W→E direction | |
| --- | --- | --- | --- |
| E | W | E | W |
| Type (DCP/DTP) | Type (DCP/DTP) | Type (DCP/DTP) | Type (DCP/DTP) |
| Primary Node | Primary Node | Primary Node | Primary Node |
| Secondary Node | Secondary Node | Secondary Node | Secondary Node |
| Terminal Node | Terminal Node | Terminal Node | Terminal Node |

RIP table format example

DTP path

OPTICAL TRANSMISSION APPARATUS IN RING TRANSMISSION SYSTEM

CROSS REFERENCE TO RELATED APPLICATIONS

This application is a continuation of International Application No. PCT/JP2004/014324, filed on Sep. 30, 2004, now pending, herein incorporated by reference.

TECHNICAL FIELD

The present invention relates to optical transmission apparatus in a ring transmission system of BLSR (Bi-directional Line Switched Ring) structure having bidirectional transmission capability, and more particularly, optical transmission apparatus capable of expanding the upper limit of the number of optical transmission apparatuses (nodes) installable in one ring.

BACKGROUND ARTS

A ring transmission system of BLSR (Bi-directional Line Switched Ring) structure having a bidirectional transmission capability (hereafter, may simply be referred to "BLSR system" depending on the cases) is realized conforming to the SONET (Synchronous Optical Network), in which, typically, a ring-shaped transmission path is configured by connecting between each plurality of optical transmission apparatuses through optical fiber lines having work channels ordinarily for use in data transmission and protection channels for standby. In normal cases, a data is transmitted from an add node in which the data is inserted into the ring to a drop node in which the data is extracted from the ring, through a path being set in the work channel. On the occurrence of any fault in the work channel, the data transmission path is switched over so as to use the protection channel, through which the data is circulated in the opposite direction to the transmission direction through the work channel, and the data is transmitted to the drop node.

Here, as a transmission mode in the BLSR system, a system termed OC (Optical Carrier)-48 is adopted. In the OC48, in a line configured of one optical fiber, 48 time slots are time multiplexed, thereby forming 48 channels per line, of which a half, i.e. 24 channels, are allotted to the work channels, while the remaining 24 channels are allotted to the protection channels. In a so-called two-fiber BLSR structure, each node is connected with two optical fibers, thus configuring a ring network, in which each optical fiber line includes 24 work channels and 24 protection channels. Further, the transmission directions of the respective optical fibers are opposite. Namely, the work channels and the protection channels of one optical fiber transmit data clockwise, while the work channels and the protection channels of the other optical fiber transmit data counterclockwise. Therefore, on the occurrence of a fault in a certain work channel, the data transmission path is switched over to a protection channel of the other optical fiber, and data are transmitted in the opposite direction to the original transmission direction through the work channel.

Figure 1A:
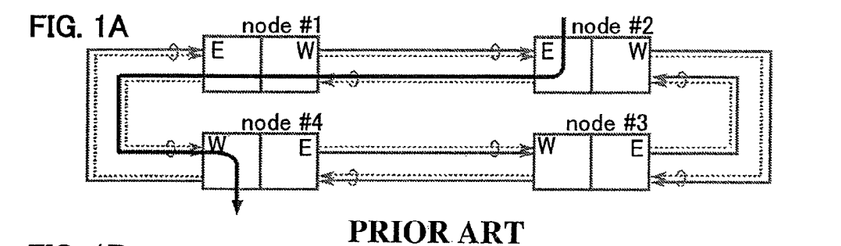
FIG. 1 shows a diagram illustrating an exemplary operation of the BLSR ring transmission system.
Figure 1B:
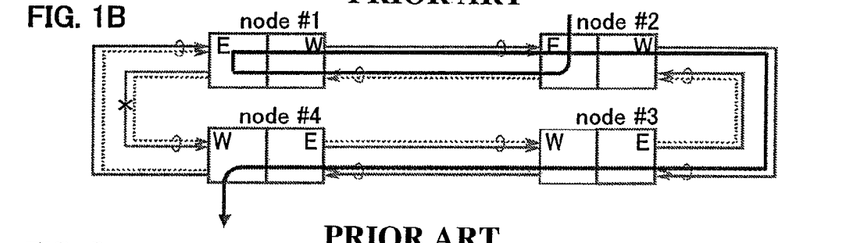

FIG. 1 shows a diagram illustrating an exemplary operation of the BLSR ring transmission system. In FIG. 1, solid lines represent the work channels, while dotted lines represent the protection channels. The above is also applicable to the drawings following FIG. 1, FIG. 1(a) illustrates an operation example in a normal case, while FIG. 1(b) illustrates an operation example in case a fault has occurred. The BLSR system includes four nodes 1, 2, 3 and 4, each node being connected through two optical fibers, so as to configure a ring network. Further, each optical fiber includes work channels and protection channels. Also, each node includes an E (East) side and a W (West) side, where a clockwise rotation direction is defined as E→W direction, while a counterclockwise rotation direction is defined as W→E direction.

In FIG. 1, when a data is transmitted from an add node 2 to a drop node 4, a path is set on a work channel of the optical fiber via node 1 through which the data is transmitted counterclockwise (W→E direction). In the normal case shown in FIG. 1(a), according to the above path, data is transmitted from add node 2 via node 1, and reaches drop node 4. Meanwhile, when there is any fault on the work channel, for example, between node 1 and node 4 as shown in FIG. 1(b), the transmission line is switched in node 1 to a protection channel in the other optical fiber, and the data is transmitted through the protection channel in the clockwise direction (E→W direction) via nodes 2, 3, and reaches drop node 4.

Now, in the BLSR system, when the path is set on a work channel in the ring, as information for deciding whether data can be relieved in the event of a fault on the work channel of interest, a squelch table is generated on a channel-by-channel basis in each node in which the path exists. 'Squelch' signifies processing for preventing the data (optical signal) being in transmission from being connected to an incorrect node and relieving the data, which is performed when the ring transmission path falls into a state of being divided into sections due to the fault occurrence on a ring line. More specifically, the squelch is the processing performed in each node to add an AIS (Alarm Indication Signal) to the optical signal, thereby preventing optical signal crosstalk.

To realize the above squelch function, the squelch table is provided in each node. The squelch table is a table having cross-connect information necessary for squelching stored therein. More specifically, for each work channel, data indicating a source node (add node) ID and a destination node (drop node) ID are stored. By means of the above squelch table, each node can obtain cross-connect information, regarding from which node to which node a path has been set.

Figure 2:
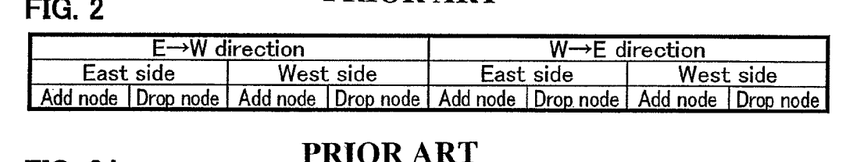
FIG. 2 shows a diagram illustrating an exemplary squelch table format.

FIG. 2 shows a diagram illustrating an exemplary squelch table format. As shown in FIG. 2, a squelch table (SQLTBL) retains information of the add node and the drop node in regard to a path, on a basis of each cross-connect direction (W→E direction/E→W direction) and each node side (E side/W side). Each squelch table is generated in the entire nodes in which a path is existent.

Figure 3A:
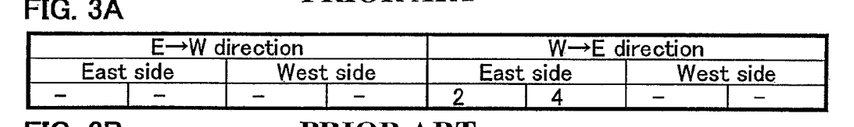
FIG. 3 shows a diagram illustrating an exemplary squelch table being set by a path exemplified in FIG. 1.
Figure 3B:
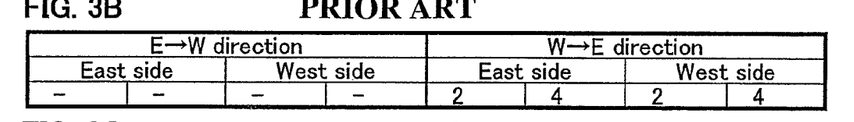
Figure 3C:
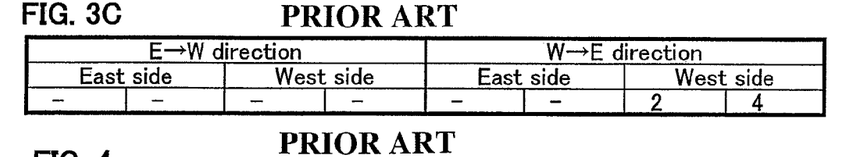

FIG. 3 shows a diagram illustrating an exemplary squelch table (SQLTBL) being set by a path exemplified in FIG. 1. There are shown the examples of the squelch tables for node 2 in FIG. 3(a), for node 3 for FIG. 3(b), and for node 4 in FIG. 3(c). Node 2 is an add node, in which optical signals (data) are inserted from the E side of node 2, and the data are transmitted in the W→E direction, and therefore, IDs of the add node and the drop node are stored in the fields on the E side of the W→E direction, as shown in FIG. 3(a). Node 1 is a through node, in which optical signals (data) are transmitted on both W side and E side of node 1, and therefore, IDs of the add node and the drop node are stored in the both fields of the E side and the W side in the W→E direction. Node 4 is a drop node, in which optical signals from node 1 are received on the W side. Accordingly, as shown in FIG. 3(c), IDs of the add node and the drop node are stored in the fields of the W side in the W→E direction.

The above squelch table is automatically formed at the time of setting the cross-connect, by use of a squelch data link, which is a control channel.

Figure 4:
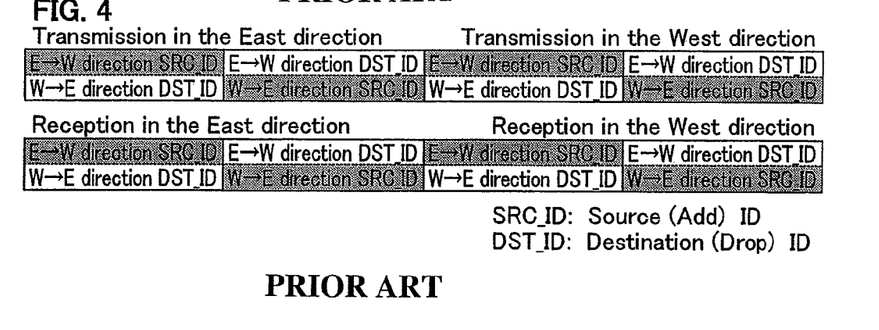
FIG. 4 shows an exemplary format of a squelch data link.

FIG. 4 shows an exemplary format of a squelch data link. The squelch data link includes cross-connect information constituted of the combination of the ID (SRC_ID) of the add node (source node) with the ID (DST_ID) of the drop node (destination node). Further, the squelch data link includes areas for storing the cross-connect information on the basis of 'for transmission'/'for reception', W side/E side, and transmission direction (E→W direction/W→E direction). Each cross-connect information set is formed of 1 byte: 4 bits assigned to the add node ID, and 4 bits assigned to the drop node ID. Hereafter, a procedure for automatically forming the squelch table using the squelch data link will be described, taking a path shown in FIG. 5 as an example.

Figure 5:
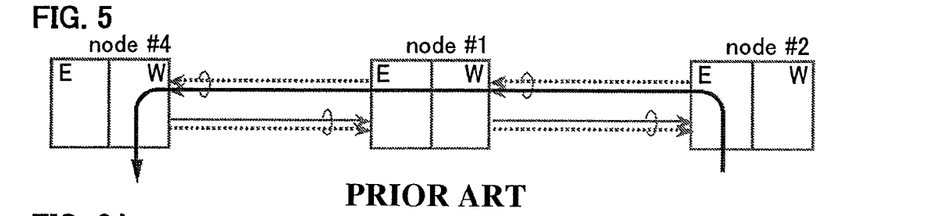
FIG. 5 shows a diagram illustrating a path for explaining a procedure for automatically forming a squelch table.

FIG. 5 shows a diagram illustrating the path for explaining the procedure for automatically forming the squelchtable. In the path shown in FIG. 5, an optical signal is added from the E side of node 2, transmitted to the W→E direction, and passed through node 1. Then, the optical signal is dropped on the W side of node 4.

Figure 6A:
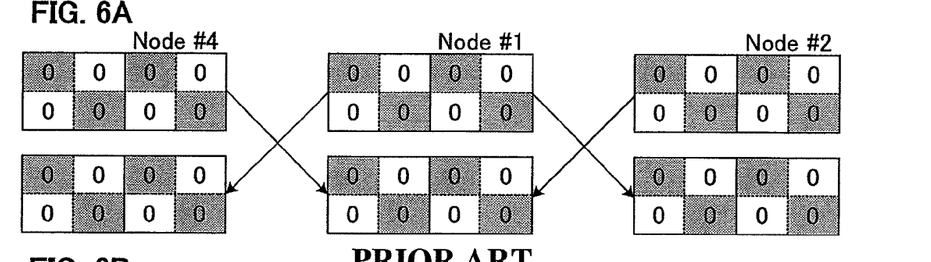
FIG. 6 shows a diagram illustrating transmission/reception values of a squelch data link in each node.
Figure 6B:
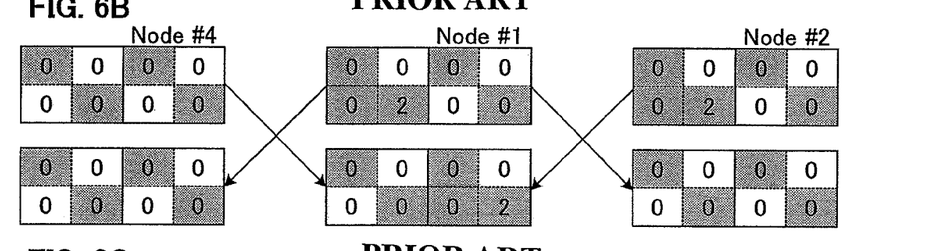

FIG. 6 shows a diagram illustrating transmission/reception values of the squelch data link in each node. FIG. 6(a) is a diagram illustrating a data link state in the initial state prior to the path setting, in which the entire fields are set to "0". In FIG. 6(b), first, since node 2 recognizes that the self-node is an add node, node 2 stores the self-node ID (in this case, an absolute ID "2" of node 2) into the specified field (transmission, E side, W→E direction, and SRC_ID) of the data link format, so as to transmit to node 1 as a transmission value. The absolute ID is a proper ID assigned to each node. Here, at this time point, node 2 does not know which node is a drop node, and therefore, the corresponding destination node ID (DST_ID) is left intact at "0". On the W side of node 1, node 1 receives the transmission value from node 2, as a reception value. By this, node 1 can recognize which node is the add node. Since node 1 is not a drop node, node 1 transmits the reception value received from node 2 intact, from the E side to the W→E direction, as a transmission value of the E side.

Figure 6C:
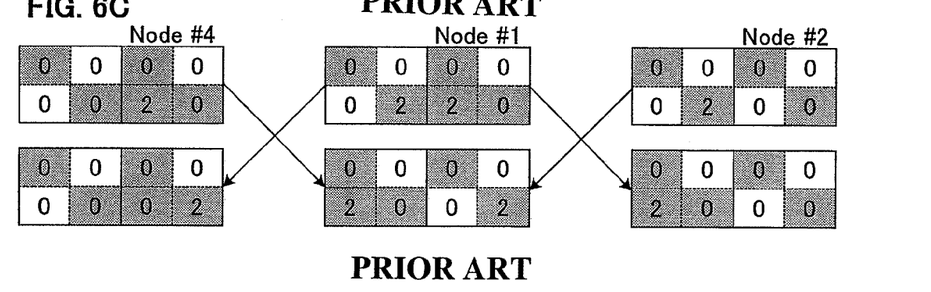

Then, as shown in FIG. 6(c), in node 4, the transmission value from node 1 is received as a reception value on the W side of node 4. With this, node 4 can recognize which node is the add node. Further, since node 4 recognizes that the self-node is the drop node, node 4 stores the self-node ID into the specified field (for transmission, W side, W→E direction, and DST_ID) of the data link.

When storing the destination ID, a relative ID being referenced from the source node ID is used, instead of an absolute ID like the aforementioned source node ID. The relative ID is an ID representing the number of nodes ahead from the source node. Therefore, the relative ID varies as the source node varies. In the exemplary case shown in FIG. 5, since node 4, or the drop node, is located two nodes ahead from node 2, or the add node (the source node), "2" is stored as the relative ID. Because each node recognizes the arrangement order (topology) of the nodes constituting the ring network, it is possible to identify any node from the relative ID. Additionally, as to the reason for using a relative ID as destination ID, description has been given in the Patent document 1 (the official gazette of the Japanese Unexamined Patent Publication No. 2002-141924) listed below. In short, the reason is that, by use of the relative ID, it becomes unnecessary to use "0" for identifying the drop node, thereby making it possible to transmit a different kind of information by allotting another meaning to "0".

Referring back to FIG. 6(c), a data link value representing the relative ID of node 4, the drop node, is transmitted as a transmission value from the W side of node 4, and received on the E side of node 1 as a reception value. Since node 1 is a through node, the above reception value is transmitted intact as a transmission value from the W side, which is then received on the E side of node 2. On receiving the relative ID, node 1 and node 2 can recognize which node is the drop node, based on the received relative ID and the topology information.

Thus, when recognizing the add node and the drop node in the path, each node generates the squelch table.

In the aforementioned squelch data link format shown in FIG. 4, the cross-connect information constituted of the combination of the add node (source node) and the drop node (destination node) is formed of 1 byte: 4 bits assigned to the add node ID, and 4 bits assigned to the drop node ID.

Figure 7:
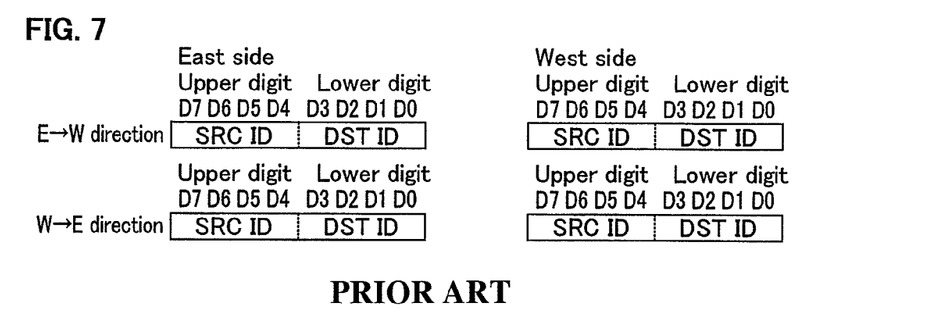
FIG. 7 shows a diagram illustrating the bit assignment of a squelch data link format.

FIG. 7 shows a diagram illustrating the bit assignment of the squelch data link format. As shown in the figure, in the cross-connect information formed of 1 byte, the upper 4 bits are assigned to the source node (SRC_ID), while the lower 4 bits are assigned to the destination node (DST_ID).

As such, in the format of the current state, because the number of bits assigned to the source node and the destination node are 4 bits, respectively, the assignable values are restricted to 16 kinds, 0 to 15. Under such the restriction, the upper limit of the nodes which can exist in one BLSR ring is 16, and it is not possible to accommodate nodes exceeding 16 in one ring.

When it is intended to form a ring network accommodating more than 16 nodes, it can be realized to form a plurality of BLSR rings each having 16 nodes or less, and interconnect the rings. For such the ring interconnection system, DCP (Drop and Continue on Protection), DTP (Dual Transmission on Protection), etc. are known. As to the ring interconnection system, since detailed description has been given in the Patent document 1 (the official gazette of the Japanese Unexamined Patent Publication No. 2002-141924) listed below, of which description will be given later, the description is omitted here.

However, in the trend of large scale networks in recent years, it has been desired to expand the upper limit of the number of nodes accommodable in one ring. Because no means is provided for relieving data in the event of a fault on the line between the rings, in contrast to the protection channels provided in the ring, data relief is intended by means of the aforementioned DCP and DTP connection systems. However, as compared to the intra-ring transmission, fault tolerance performance in the inter-ring transmission is degraded. Therefore, in order to increase the fault tolerance performance also, it is desired to expand the number of nodes accommodable in one ring.

In the Patent document 2 (the official gazette of the Japanese Unexamined Patent Publication No. 2003-224571) listed below, there has been disclosed a technique for enabling 16 nodes or more to be accommodable in one ring. However, the technique concerned is intended to expand the number of nodes which are possible to decide a path switchover in BLSR, and it is not possible to automatically form a squelch table in regard to a ring accommodating more than 16 nodes.

Also, in the Patent document 2 (the official gazette of the Japanese Unexamined Patent Publication No. 2002-141924), although there has been disclosed a method for setting an interring connection system such as the above-mentioned DCP and DTP, the setting method therefor is rather complicated.

Patent document 1: The official gazette of the Japanese Unexamined Patent Publication No. 2002-141924.

Patent document 2: The official gazette of the Japanese Unexamined Patent Publication No. 2003-224571.

DISCLOSURE OF THE INVENTION

Accordingly, it is an object of the present invention to provide anode (optical transmission apparatus) enabling expansion of the upper limit of the number of nodes capable of automatically forming a squelch table generated in advance in regard to path setting in a BLSR system.

It is another object of the present invention to provide a node (optical transmission apparatus) enabling easy setting of ring interconnection (for example, DCP and DTP) for mutually connecting the rings.

As a first configuration of the optical transmission apparatus according to the present invention to achieve the above-mentioned object, there is provided an optical transmission apparatus in a ring transmission system having a plurality of optical transmission apparatuses via a bidirectional optical transmission path connected in a ring shape, in which the plurality of optical transmission apparatuses include an add node, which is an optical transmission apparatus for adding an optical signal, and a drop node, which is an optical transmission apparatus for dropping the optical signal from the add node. The optical transmission apparatus includes: a storage means for storing arrangement order information of the plurality of optical transmission apparatuses connected in the ring shape and identification information of each optical transmission apparatus; a squelch data link processing means for receiving, from optical transmission apparatus being located adjacent to one side, a first hop count, which is the number of optical transmission apparatuses being existent between to the add node, and receiving, from optical transmission apparatus being located adjacent to the other side, a second hop count, which is the number of optical transmission apparatuses being existent between to the drop node by using a squelch data link; and a squelch table generation means for obtaining the identification information of the add node based on the arrangement order information and the received first hop count, obtaining the identification information of the drop node based on the arrangement order information and the received second hop count, and generating the squelch table storing the identification information of the add node and the drop node.

As a second configuration of the optical transmission apparatus according to the present invention, in the above first configuration, the squelch data link processing means increments the received first hop count and transmits the incremented first hop count to the optical transmission apparatus being located adjacent to the other side, and also increments the received second hop count and transmits the incremented second hop count to the optical transmission apparatus being located adjacent to the one side.

As a third configuration of the optical transmission apparatus according to the present invention, there is provided an optical transmission apparatus in a ring transmission system having a plurality of optical transmission apparatuses via a bidirectional optical transmission path connected in a ring shape, in which the ring transmission system includes a first ring system having an add node, which is an optical transmission apparatus for adding an optical signal, and a primary node and a secondary node, which are two optical transmission apparatuses for dropping the optical signal from the add node, and a second ring system connecting the primary node with the secondary node in a predetermined connection form. The above optical transmission apparatus includes: a storage means for storing arrangement order information of the plurality of optical transmission apparatuses connected in the ring shape and identification information of each optical transmission apparatus; a squelch data link processing means for receiving, from optical transmission apparatus being located adjacent to one side, a first hop count, which is the number of optical transmission apparatuses being existent between to the add node, and from optical transmission apparatus being located adjacent to the other side, receiving a second hop count, which is the number of optical transmission apparatuses being existent between to the secondary node, and from the adjacent optical transmission apparatus, receiving a third hop count, which is the number of optical transmission apparatuses being existent between to the primary node, together with information for identifying the connection form type by using a squelch data link; a squelch table generation means for obtaining the identification information of the add node based on the arrangement order information and the received first hop count, obtaining the identification information of the secondary node based on the arrangement order information and the received second hop count, and generating the squelch table storing the identification information of the add node and the secondary node; and a RIP table generation means for generating a RIP table storing at least the connection form type and the identification information of the primary node.

As a fourth configuration of the optical transmission apparatus according to the present invention, there is provided an optical transmission apparatus in a ring transmission system having a plurality of optical transmission apparatuses via a bidirectional optical transmission path connected in a ring shape, in which the ring transmission system includes a first ring system having an add node, which is an optical transmission apparatus for adding an optical signal, and a primary node and a secondary node which are two optical transmission apparatuses for dropping the optical signal from the add node, and a second ring system connecting the primary node with the secondary node in a predetermined connection form. The optical transmission apparatus includes: a storage means for storing arrangement order information of the plurality of optical transmission apparatuses connected in the ring shape and identification information of each optical transmission apparatus; a squelch data link processing means for receiving, from optical transmission apparatus being located adjacent to one side, a first hop count, which is the number of optical transmission apparatuses being existent between to the add node, and from optical transmission apparatus being located adjacent to the other side, receiving a second hop count, which is the number of optical transmission apparatuses being existent between to either one of the primary node or the secondary node, and further, from the adjacent optical transmission apparatus, receiving a third hop count, which is the number of optical transmission apparatuses being existent between to the remaining one of the primary node and the secondary node, together with information for identifying the connection form type by using a squelch data link; a squelch table generation means for obtaining the identification information of the add node based on the arrangement order information and the received first hop count, obtaining the identification information of the secondary node based on the arrangement order information and the received second hop count, and generating the squelch table storing the identification information of the add node and the secondary node; and a RIP table generation means for generating a RIP table storing at least the connection form type and the identification information of the primary node.

As a fifth configuration according to the present invention, in the above third or fourth configuration, the squelch data link processing means increments the received first hop count, the received second hop count and the received third hop count, and transmits the incremented first hop count, the incremented second hop count and the incremented third hop count to the optical transmission apparatus being located adjacent to the opposite side to the reception side.

As a sixth configuration according to the present invention, in the above third configuration, the connection form is either a first form in which the optical signal from the add node is dropped at the primary node and transmitted to the second ring system, and also the optical signal is continued to be transmitted from the primary node to the secondary node, and dropped also at the secondary node and transmitted to the second ring system, or alternatively, a second form in which the optical signal from the add node is transmitted to one direction, and dropped at the primary node and transmitted to the second ring system, and also the optical signal from the add node is transmitted also to the other direction and dropped at the secondary node and transmitted to the second ring system.

As a seventh configuration according to the present invention, in the above fourth configuration, the connection form is that the optical signal from the add node is transmitted to one direction, dropped at the primary node, and transmitted to the second ring system, and also the optical signal from the add node is also transmitted to the other direction, dropped at the secondary node, and transmitted to the second ring system.

PREFERRED EMBODIMENTS OF THE PRESENT INVENTION

Hereafter, the present embodiments of the present invention will be described referring to the drawings. However, the embodiments shown below are not intended to limit the technical scope of the present invention.

Figure 8:
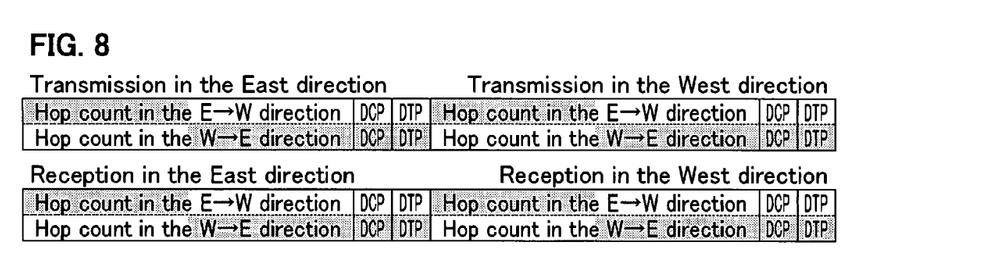
FIG. 8 shows a diagram illustrating an exemplary squelch data link format according to the embodiment of the present invention.

FIG. 8 shows a diagram illustrating an exemplary squelch data link format according to the embodiment of the present invention. In the embodiment of the present invention, the squelch data link is formed by use of cross-connect information in which the number of hops (hop count) from an add node (source node) or a drop node (destination node) is used. The hop count represents a node-to-node number. For example, the hop count to an adjacent node is 1. In the present embodiment, the add node and the drop node are identified using the above hop count.

Further, the cross-connect information according to the present embodiment also includes whether the ring interconnection form is DCP (Drop and Continue on Protection) or DTP (Dual Transmission on Protection), in addition to the hop count information. In regard to the above DTP and DCP, detailed description will be given later. Further, as shown in FIG. 4, the squelch data link format includes areas for storing cross-connect information on the basis of 'for transmission'/'for reception', as well as W side/E side and also transmission direction (E→W direction/W→E direction).

Figure 9A:
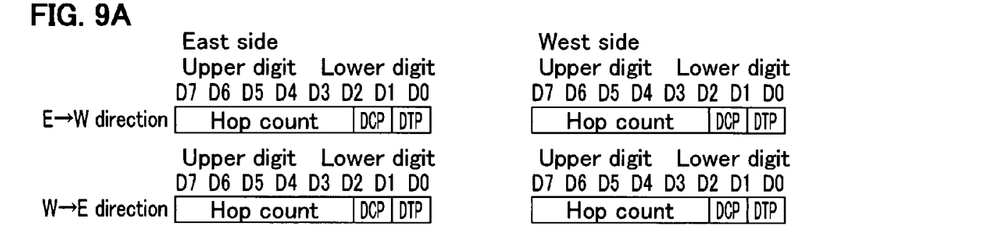
FIG. 9 shows a diagram illustrating the bit assignment of a squelch data link format according to the embodiment of the present invention.

FIG. 9 shows a diagram illustrating the bit assignment of the squelch data link format according to the embodiment of the present invention. In FIG. 9(*a*), only a format for either transmission or reception is illustrated, in which the bit assignment of cross-connect information for each transmission/reception side (E side/W side) and for each data transmission direction (W→E direction/E→W direction) is shown. Each cross-connect information is formed of 1 byte (8 bits), which is divided in to three fields of the hop count, DCP and DTP, and for example, the lower 2 bits (D0, D1) are assigned to DCP and DTP, while the hop count is assigned in the upper 6 bits (D2-D7).

Figure 9B:
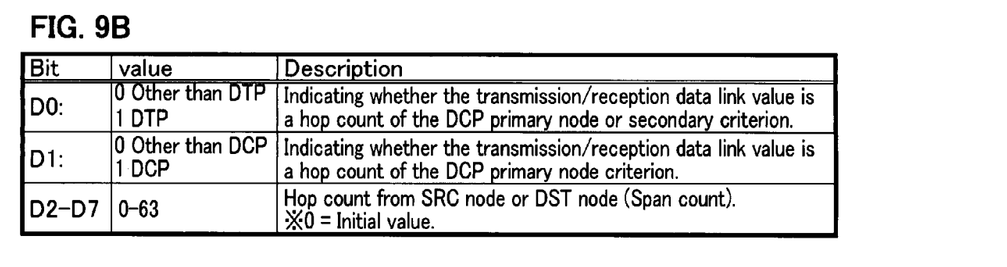

FIG. 9(*b*) is a diagram illustrating a set rule for the squelch data link. According to FIG. 9(*b*), the bit D0 is set to '1' when the DCP connection is performed, while the bit D1 is set to '1' when the DTP connection is performed. Also, in the bits D2-D7, the hop count from the source node or the destination node is set as a value from 0 to 63.

In case of the present embodiment, 6 bits are assigned for the hop count, and accordingly, in a BLSR system accommodating maximum 64 nodes in one ring, the squelch table can be formed automatically. Therefore, it becomes possible to greatly expand the number of nodes accommodable in one ring, as compared to the conventional method (conventionally, 16 nodes). Further, since the above expansion can be achieved only by modifying the squelch data link format through software modification without modification of the hardware node configuration constituting the BLSR system, the expansion of the number of nodes can be achieved quite easily.

Hereafter, taking a path shown in FIG. 10 as an example, a procedure for automatically forming the squelch data table using the squelch data link in the present embodiment will be described.

Figure 10:
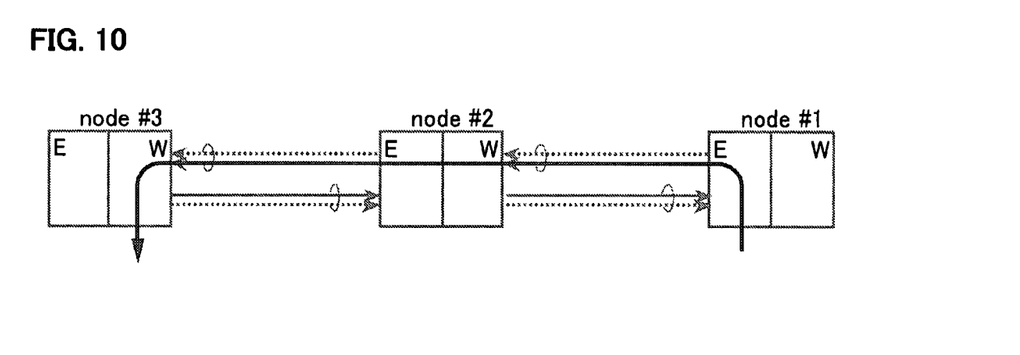
FIG. 10 shows a diagram illustrating a path for explaining a procedure for automatically forming a squelch table according to the embodiment of the present invention.

FIG. 10 shows a diagram illustrating a path for explaining the procedure for automatically forming the squelch table according to the embodiment of the present invention. In the path shown in FIG. 10, an optical signal is added from the E side of node 1 and transmitted to the W→E direction, and after passing through node 2, the optical signal is dropped on the W side of node 3. Here, each node stores information of a node arrangement order allocated in the ring and ID information proper to each node (absolute ID) in a predetermined internal storage means, and each node can refer to or obtain the above information at appropriate times.

FIG. 11 shows a diagram illustrating transmission/reception data of a data link in each node. FIG. 11(*a*) is a diagram illustrating a data link state in the initial state before the path setting, in which the entire fields are "0". Since no path exists from a self-node to the self-node in the BLSR system, it is possible to use a hop count value of "0" as an initial value.

In FIG. 11(*b*), first, node 1 has a cross-connect setting of "add", and since node 1 recognizes that the self-node is an add node, node 1 increments by 1 the hop count value in the specified transmission value field (E side, W→E direction) of the data link format (in this case, the hop count is changed from the initial value "0" to "1"). At this time, the DTP and DCP fields remain the initial values "0". Then, node 1 transmits a data link transmission value (hop count "1", DCP "0" and DTP "0") from the E side.

As shown in FIG. 11(*c*), the transmission value from node 1 is received on the W side/W→E direction of node 2, as a reception value. Using the reception side (in this case, the W side) of the reception value and the hop count "1" in the reception value, node 2 can recognize that the add node is node 1 which is located adjacent to the W side. Also, since node 2 has a "through" cross-connect setting, node 2 increments the hop count in the reception value by 1 (in this case, the hop count is changed from "1" to "2"), and transmits the above hop count from the E side, as a transmission value (DCP and DTP remain "0").

As shown in FIG. 11(*d*), the transmission value from node 2 is received on the W side/W→E direction of node 3, as a reception value. Using the reception side (in this case, W side) of the reception value and the hop count of "2" in the reception value, node 3 can recognize that the add node is node 1 which is located two hops ahead on the W side. More specifically, using the node arrangement order information and the hop count retained in each node, node 1 can be identified, and the node ID proper to node 1 is obtained from the proper ID information retained in each node. Also, since node 3 has a drop cross-connect setting, node 3 recognizes that the set path is node 1 (add) node 2 (through)→node 3 (drop).

Figure 11A:
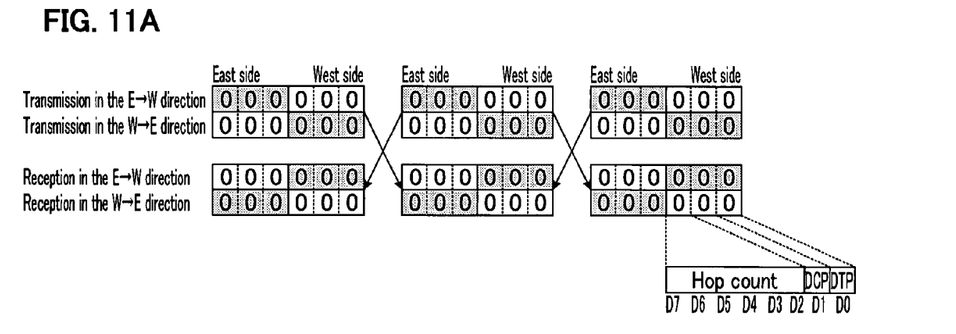
FIG. 11 shows a diagram illustrating transmission/reception data of a data link in each node when automatically forming a squelch table according to the embodiment of the present invention.
Figure 11B:
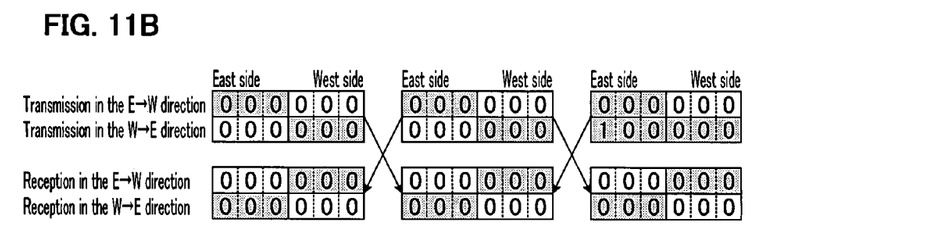
Figure 11C:
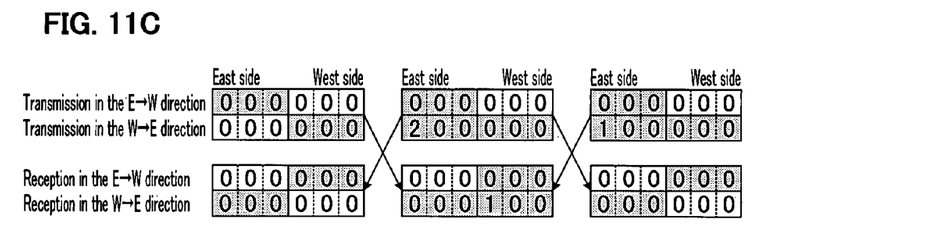
Figure 11D:
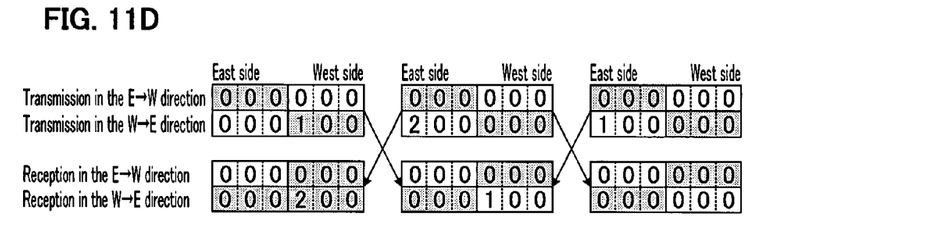

Then, because it is necessary for node 3 to inform node 2 and node 1 that the self-node is the drop node, node 3 increments by 1 the hop count in the transmission value field on the W side/W→E direction, and transmits the above transmission value (in this case, the value is changed from the initial value "0" to "1"). At this time, DCP and DTP remain the initial values "0".

As shown in FIG. 11(*e*), the transmission value from node 3 is received on the E side/W→E direction of node 2, as a reception value. Using the reception side (in this case, the E side) of the reception value and the hop count "1" in the reception value, node 2 can recognize that the drop node is node 3 which is located adjacent to the E side. Also, since the add node and the drop node have been decided, node 2 recognizes that the set path is node 1→node 2→node 3.

Figure 11E:
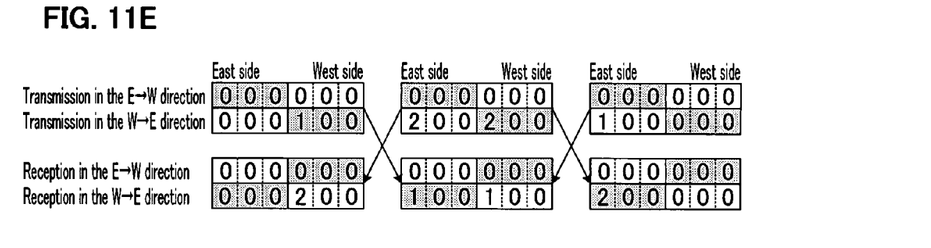

Also, since node 2 is a through node, node 2 increments the received hop count by 1 (in this case, the hop count is changed from "1" to "2"), and transmits the above value from the W side, as a transmission value (DCP and DTP remain "0").

The transmission value from node 2 is received on the E side/W→E direction of node 1, as a reception value. Using the reception side (in this case, the E side) of the reception value and the hop count "2" in the reception value, node 1 recognizes that the add node is node 3 which is located two hops ahead on the E side. More specifically, by use of the node arrangement order information and the hop count, node 1 identifies node 3, and further, obtains the node ID proper to node 3 from proper ID information retained in each node. Thus, since the add node and the drop node have been decided, the set path is also recognized to be node 1→node 2→node 3.

Thus, the entire nodes with cross-connect setting can know that the set path is a path in which an optical signal is added to node 1, passes through node 2, and is dropped at node 3, and thus, it becomes possible to generate the squelch table. Namely, in the squelch table, the ID of node 1, which is the add node, is registered as source node ID, and also, the ID of node 3, which is the drop node, is registered as destination node ID.

Figure 12A:
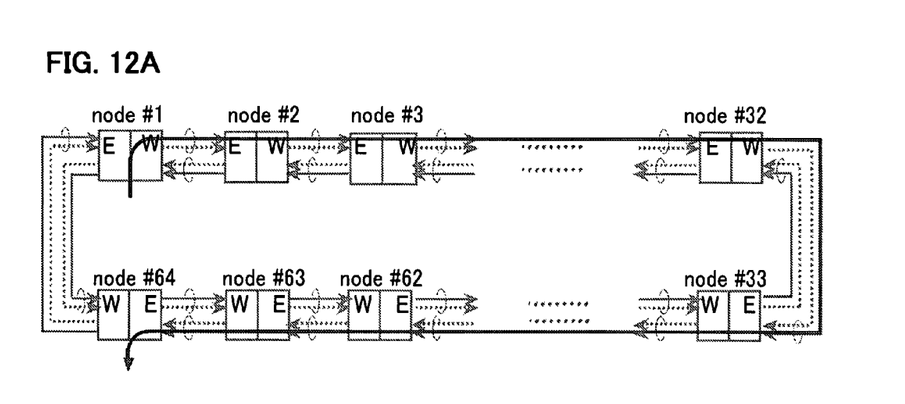
FIG. 12 shows a diagram illustrating an exemplary squelch data link in a BLSR system accommodating 64 nodes in one ring.
Figure 12B:
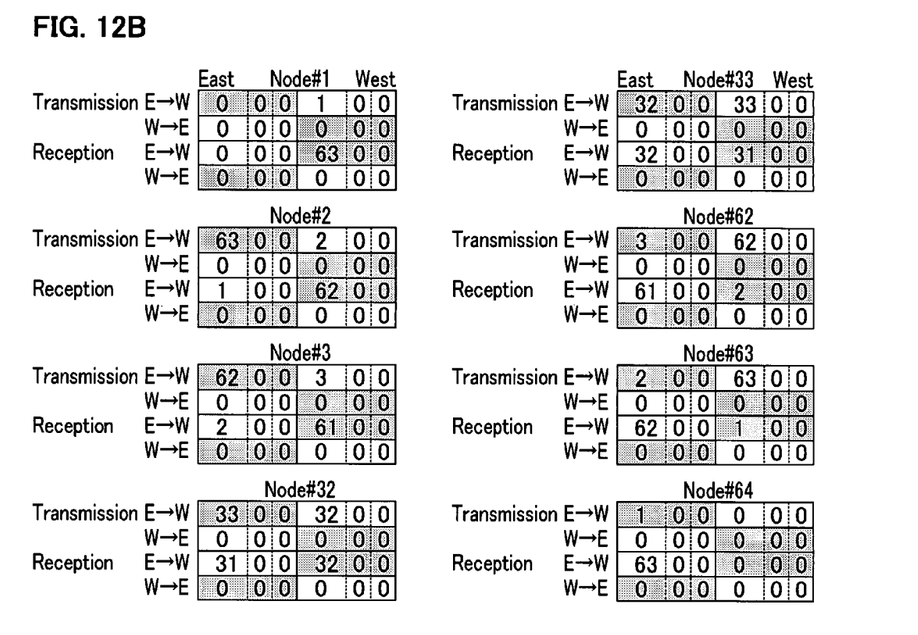

FIG. 12 shows a diagram illustrating an exemplary squelch data link in a BLSR system accommodating 64 nodes in one ring. FIG. 12(*a*) is a diagram illustrating an example of path setting in the BLSR system accommodating 64 nodes in one ring, indicating a state that an add—through—drop path is set from node 1 to node 64 in the E→W direction. FIG. 12(*b*) shows a diagram illustrating final states of the transmission and reception values of the squelch data link in each node, when the path shown in FIG. 12(*a*) is set. From the transmission and reception values in each node and the cross-connect state in the self-node, each node can know that the add node is node 1 and the drop node is node 64. By this, each node can generate the squelch table.

As having been described, according to the present embodiment, by applying the hop count from the add node or the drop node, in place of the node ID of the own, as information of the add node, the drop node, etc. necessary for generating the squelch table, it becomes unnecessary to transmit and receive two information sets, source node ID and destination node ID, as having been required in the conventional method, thereby enabling effective use of the squelch data link bits. Preferably, by assigning 6 bits for the hop count among the cross-connect information formed of 1 byte, the hop count from 0 to 63 can be handled, and accordingly, even in case of accommodating 64 nodes in maximum per one ring of the BLSR system, each node can recognize the add node and the drop node, and the squelch table can be formed automatically.

Next, DCP and DTP will be described.

According to the BLSR specification, when it is required to have nodes more than the number of nodes accommodable in a ring, it is intended to interconnect two rings or more. The above interconnection system between the rings includes two types: DCP (Drop and Continue on Protection) and DTP (Dual Transmission on Protection).

Further, each node is configured to be able to know whether the self-node belongs to DCP or DTP by means of a table called RIP (Ring Interworking On Protection) table. The above RIP table includes information in which information necessary for connecting between two ring transmission systems or more is stored. Because the above RIP table is generated, the ring transmission system connected by means of two rings or more can be realized.

In a first ring transmission system and a second ring transmission system being interconnected, with the provision of two drop nodes in a first ring signal system, optical signals are transmitted from the first ring transmission system to the second ring transmission system through two routes in the DCP connection and the DTP connection. Namely, in the second ring transmission system, there are provided two add nodes respectively connected to the two drop nodes in the first ring transmission system, signifying a connection configuration in which one optical signal having better quality out of the added optical signals of the two routes is selected in one add node specified in advance.

Here, the two drop nodes in the first ring transmission system are referred to as primary node and secondary node, respectively, while the add node in the first ring transmission system is referred to as terminal node.

Further, the optical signals independently received in the primary node and the secondary node are transmitted to the two add nodes in the second ring transmission system through the two routes, and the optical signal having better quality is selected, which is then transmitted in the second ring transmission system. Further, the use of either the above DCP connection or the DTP connection is selected depending on the location relationship among the terminal node, the primary node and the secondary node. Typically, the DCP connection is a connection configuration in which a signal added to the terminal node is dropped at the primary node, and the transmission is continued intact, and further, the signal is dropped at the secondary node. Also, the DTP connection is a connection configuration in which an optical signal added to the terminal node is transmitted to both directions (W→E direction/E→W direction), and the optical signal is dropped at the primary node located in one direction, as well as at the secondary node located in the other direction.

Figure 13A:
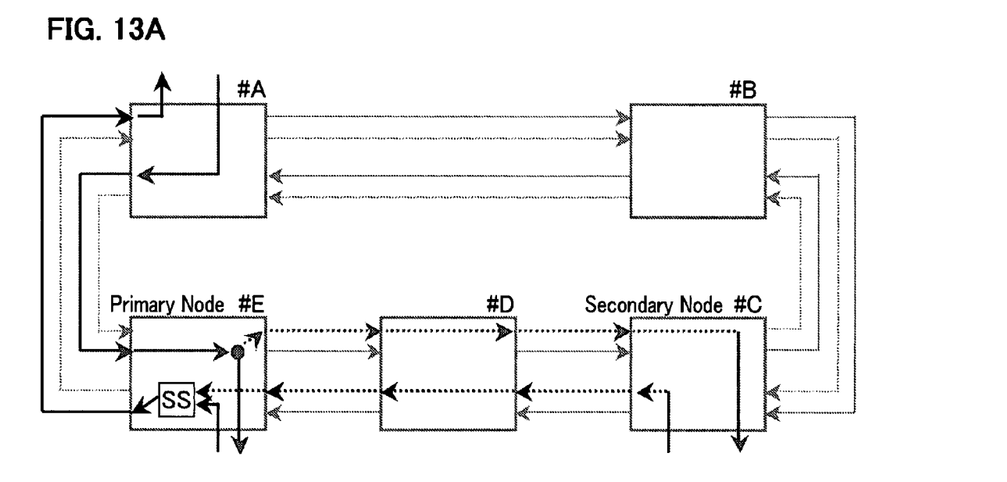
FIG. 13 shows a diagram explaining DCP connection and DTP connection.

FIG. 13 shows a diagram explaining the DCP connection and the DTP connection. FIG. 13(c) shows the configuration of the DCP connection, in which an optical signal transmitted from a terminal node A, that is, an add node of the first ring transmission system passes through a work channel, and arrives at a primary node E, a drop node. The primary node E drops the optical signal, and transmits to another add node (primary node) of a non-illustrated second optical ring transmission system, and also transfers the optical signal to a secondary node C through a protection channel. The secondary node C transfers the received optical signal to another add node (secondary node) of the non-illustrated second optical ring transmission system. Using the protection channel, the secondary node of the second optical ring transmission system transmits the optical signal to the primary node of the second optical ring transmission system. The primary node of the second optical ring transmission system compares the optical signal quality received from the primary node C of the first ring transmission system with the optical signal quality received from the secondary node of the second ring transmission system. Then, the optical signal having better quality is selected in a service selector (SS), so as to transmit. Here, in FIG. 13(a), there is also shown an optical signal route when the optical signal is transmitted from the second ring transmission system side, and contrary to the above description, the primary node E receives both the optical signal from the primary node in the second ring transmission system and the optical signal from the secondary node C, and the optical signal having better quality is selected in the service selector SS, and transferred to the node A.

Figure 13B:
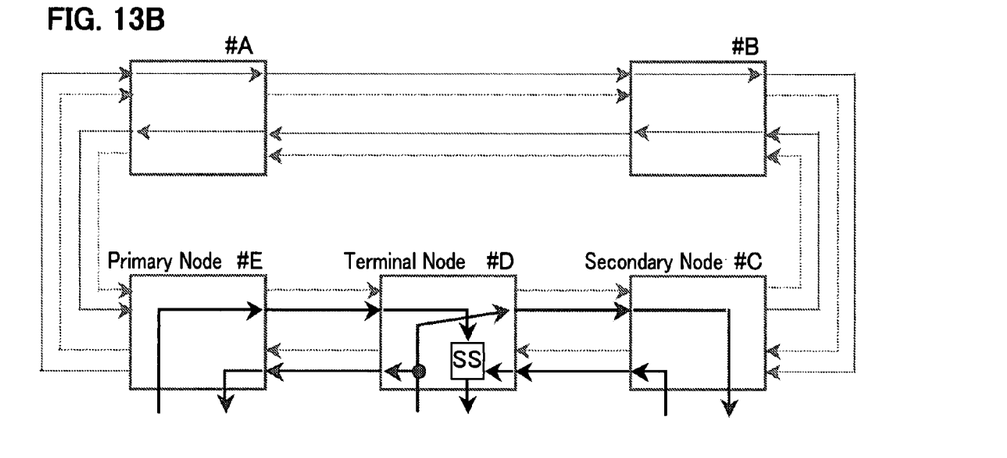

FIG. 13(b) shows the configuration of the DTP connection. The point of difference from FIG. 13(a) is that, in the terminal node D, the optical signal is transmitted to two directions (W→E direction/E→W direction). To the primary node E, the optical signal is transmitted using the work channel, while to the secondary node C, the optical signal is transmitted using the protection channel. The DTP connection is used when a terminal node is disposed between the primary node and the secondary node. In such the case, if the optical signal for standby is transmitted from the primary node E to the secondary node C through the protection channel, the line efficiency is bad because the transmission distance becomes as long as almost one round along the ring. Therefore, in the DTP connection, the optical signal is transmitted from the terminal node (add node) D to both directions using the work channel and the protection channel. With this, using the protection channel, the transmission distance becomes short, which enables increase of the line efficiency. Additionally, in FIG. 13(b) also, there is shown an optical signal route in case optical signals are received from the non-illustrated second optical ring transmission system.

Now, in case of the DCP connection and the DTP connection, the primary node and the secondary node become drop nodes, and in the above case, a node registered as destination node in the squelch table is predetermined to be the secondary node, and information in regard to the primary node is not registered in the squelch table. Therefore, when performing the DCP connection and the DTP connection, if only the squelch table is used, it is not possible to express cross-connect information in the DCP connection and the DTP connection. To complement the above, the RIP table (Ring Interworking Protection) table is formed.

Figure 14:
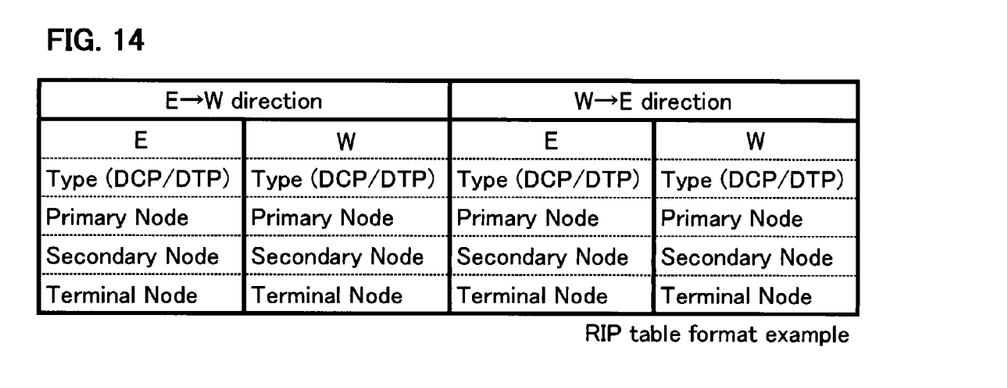
FIG. 14 shows an exemplary format of a RIP table.

FIG. 14 shows an exemplary format of the RIP table. The RIP table is a table in which a connection form type (DCP/DTP) between the mutual rings and cross-connect information constituted of node ID (absolute ID) proper to each node, i.e. primary node, secondary node or terminal node are stored on a node-by-node basis. In a similar manner to the squelch table, the RIP table is set on a basis of each node side (E/W) and each transmission direction (W→E direction/E→W direction).

Figure 15:
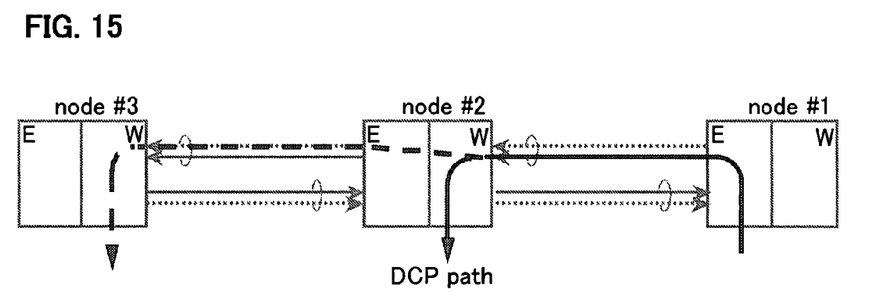
FIG. 15 shows a diagram illustrating a path for explaining a procedure for automatically forming a squelch table (and a RIP table) in DCP.

FIG. 15 shows a diagram illustrating a path for explaining a procedure for automatically forming the squelch table (and the RIP table) in DCP. In the path shown in FIG. 15, an optical signal is added from the E side of node 1, a terminal node, which is then transmitted to the W→E direction through the work channel, and dropped on the W side of node 2, a primary node, and further, transmitted from node 2 to node 3, a secondary node, through the protection channel, and also dropped on the W side of node 3.

FIG. 16 shows a diagram illustrating the transmission/reception values of the squelch data link for each node in DCP. FIG. 16(a) shows a squelch data a link state at the initial state before the path setting, in which the entire fields have initial values "0".

Figure 16A:
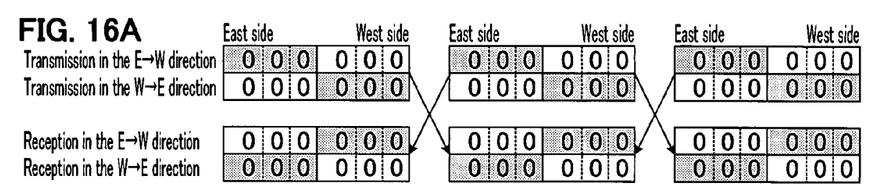
FIG. 16 shows a diagram illustrating transmission/reception values of a squelch data link for each node in DCP.
Figure 16B:
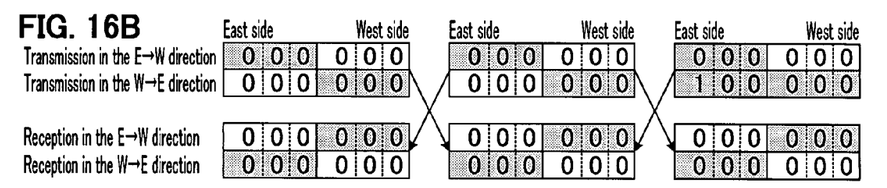

In FIG. 16(b), first, node 1, which is a terminal node, has a cross-connect setting of "add", and since node 1 recognizes that the self-node is an add node, node 1 increments by 1 the hop count value in the specified transmission value field (E side, W→E direction) in the data link format (in this case, the hop count is changed from the initial value "0" to "1"). At this time, the DTP and DCP fields remain the initial values "0". Then, node 1 transmits data link set values (hop count "1", DCP "0", and DTP "0").

Figure 16C:
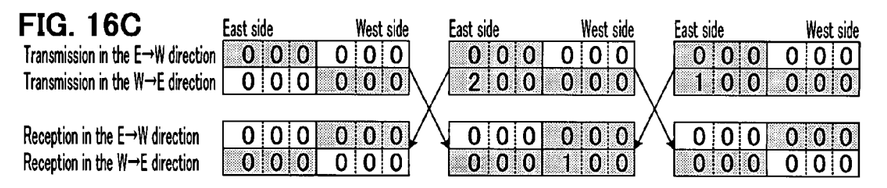

As shown in FIG. 16(c), the transmission value from node 1 is received on the W side/W→E direction of node 2, as a reception value. Using the reception side of the reception value and the hop count "1" in the reception value, node 2 can recognize that an optical signal is added to node 1 which is located adjacent to the W side of node 2. Also, since node 2, a primary node, is a drop node, and transmits the optical signal further using the protection channel, node 2 increments the hop count in the reception value by 1 (in this case, the hop count is changed from "1" to "2"), and transmits the transmission value from the E side (DCP and DTP remain "0").

Figure 16D:
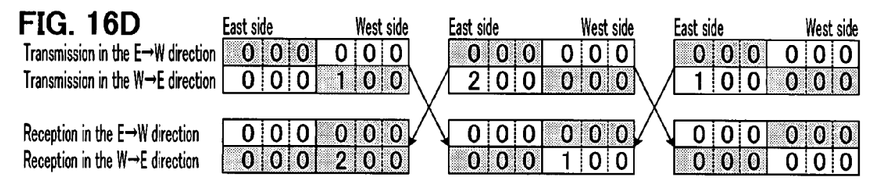

As shown in FIG. 16(d), the transmission value from node 2 is received on the W side/W→E direction of node 3, a secondary node, as a reception value. Using the reception side (in this case, the W side) of the reception value and the hop count "2" in the reception data link value, node 3 can recognize that an optical signal is added to node 1 which is located two hops ahead on the W side of node 3.

Then, in order to inform node 2 and node 1 that the self-node is the drop node, node 3 increments by 1 the hop count in the transmission value field of the W side/W→E direction, and transmits the above transmission value from the W side (in this case, the hop count is changed from the initial value "0" to "1"). At this time, DCP and DTP remain the initial values "0".

Figure 16E:
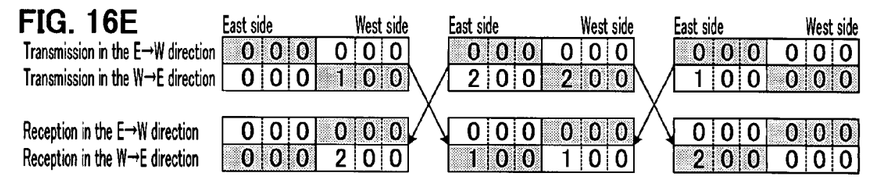

As shown in FIG. 16(e), the transmission value from node 3 is received as a reception value on the E side/W→E direction of node 2. Using the reception side (in this case, the E side) of the reception value and the hop count "1" in the reception data link value, node 2 can recognize that node 3, which is located adjacent to the E side of node 2, is a drop node at which the optical signal is dropped.

Then, node 2 increments the hop count in the reception value by 1 (in this case, the hop count is changed from "1" to "2"), and transmits from the W side as a transmission value (DCP and DTP remain "0").

The transmission value from node 2 is received on the E side/W→E direction of node 1. Using the reception side (in this case, the E side) of the reception value and the hop count "2" in the reception data link value, node 1 recognizes that the optical signal is dropped at node 3 which is located two hops ahead on the E side of node 1.

At this stage, each node recognizes that a path of node 1→node 2→node 3 has been set, but does not recognize at all in regard to the DCP connection.

As such, each node has been able to know the existence of the path, node 1→node 2→node 3. However, the actual path is a path of the DCP connection performed in node 2, a primary node, and a cross-connect setting of the DCP connection has been made in node 2. Therefore, subsequently, node 2 informs node 1 and node 3 that the path is a DCP connection path. The DCP notification by node 2 is made after the completion of the notifications of the above-mentioned FIGS. 16(a) through 16(e) in regard to the path of node 1→node 2→node 3. By confirming that the hop count reception values on the E side and the W side are other than "0", node 2 can decide that the processing up to FIG. 16(e) has been completed.

Figure 16F:
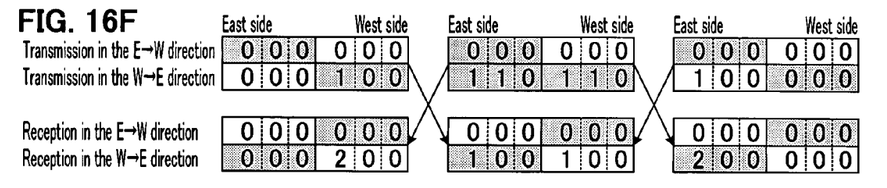

As shown in FIG. 16(f), according to the set rule for the squelch data link format shown in FIG. 9(b), on the W side and the E side of node 2, each DCP in the transmission value fields of the W→E direction is set to "1", and node 2 transmits the above value to both node 1 and node 3, as a transmission value (the hop count remains "1", and DTP remains "0").

Figure 16G:
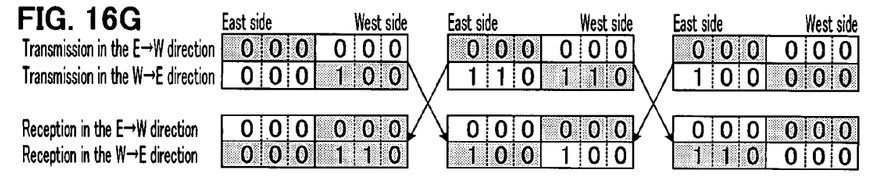

As shown in FIG. 16(g), each transmission value from node 2 is received on the E side of node 1 and on the W side of node 3, as a reception value. From the DCP value of "1", at this time point, node 1 and node 3 recognize that the path is the DCP connection. Further, since a transmission source node having the transmission value of the DCP value "1" is a primary node, from the hop count (in this case, "1") in the reception value, node 1 and node 3 recognize that the primary node is node 2. Then, node 3 recognizes the self-node as secondary node from the fact that the self-node is a drop node, and also recognizes the remaining node 1 as terminal node. Node 1 recognizes the self-node as terminal node from the fact that the self-node is an add node, and also recognizes the remaining node 3 as secondary node.

As described above, by obtaining cross-connect information in regard to the DCP connection path, each node can automatically form the squelch table and the RIP table. Here, in case of the DCP connection, a source node ID registered in the squelch table is the ID of node 1, the terminal node, while a destination node ID is the ID of node 3, the secondary node. As described above, because the DCP/DTP type, the terminal node ID, the primary node ID and the secondary node ID are stored in the RIP table, it is possible to describe the cross-connect state of the path by means of the squelch table and the RIP table.

Figure 17:
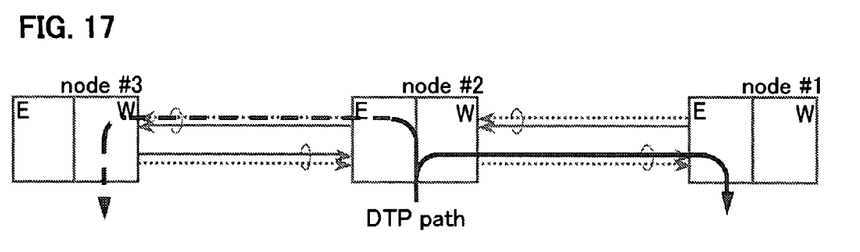
FIG. 17 shows a diagram illustrating a path for explaining a procedure for automatically forming a squelch table (and a RIP table) in DTP.

FIG. 17 shows a diagram illustrating a path for explaining a procedure for automatically forming the squelch table (and the RIP table) in DTP. In the path shown in FIG. 16, an optical signal is added to node 2, the terminal node, and transmitted to the E→W direction from the W side of node 2 through the work channel, which is then dropped on the E side of node 1, the primary node. Meanwhile, the above optical signal is also transmitted from the E side of node 2 to node 3, the secondary node, through the protection channel, which is also dropped on the W side of node 3.

FIG. 18 shows a diagram illustrating transmission/reception values of the squelch data link in each node in case of DTP. FIG. 18(a) shows a diagram illustrating the data link state in the initial state before the path setting, in which the entire fields has initial values "0".

Figure 18A:
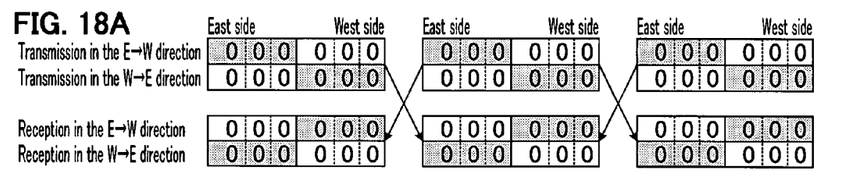
FIG. 18 shows a diagram illustrating transmission/reception values of a squelch data link in each node in case of DTP.
Figure 18B:
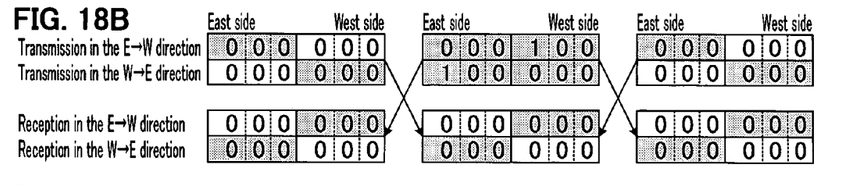

In FIG. 18(b), first, when a DTP cross-connect setting is made in node 2, the terminal node, node 2 increments by 1 the hop counts on both the E side/W→E direction and the W side/E→W direction, according to the set rule of the squelch data link format shown in FIG. 9(b) (in this case, the hop count is changed from the initial value "0" to "1"). At this time, the DTP and DCP fields remain the initial values "0". Then, node 2 transmits the set transmission values (the hop count "1", DCP "0" and DTP "0") from both the W side and the E side. Additionally, the data link from the E side of node 2 is transmitted to node 3 through the protection channel, while the data link from the W side of node 2 is transmitted to node 1 through the work channel. The above is because node 1 is set as primary node and node 3 is set as secondary node, by the DTP cross-connect setting.

Figure 18C:
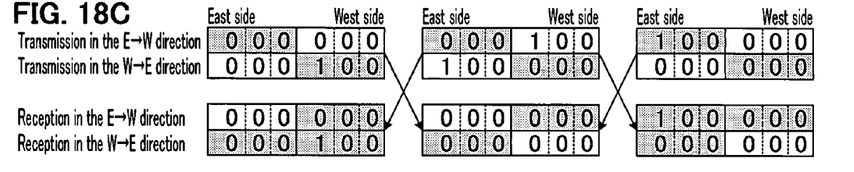

As shown in FIG. 18(c), the reception value from node 2 is received in the E side of node 1 and the W side of node 3, respectively. Using the reception side (in this case, the E side) of the reception value and the hop count "1" in the reception value, node 1 recognizes that an optical signal is to be added to node 2 which is located adjacent to the E side of node 1. Also, using the reception side (in this case, the W side) of the reception value and the hop count "1" in the reception value, node 3 recognizes that an optical signal is to be added to node 2 which is located adjacent to the W side of node 1.

Then, because of having a cross-connect setting of "drop", node 1 and node 3 inform node 2 thereof. Typically, node 1 increments by 1 the hop count in the transmission value field of the E side/E→W direction, and node 3 increments by 1 the hop count in the transmission value field of the W side/W→E direction (in this case, each hop count is changed from the initial value "0" to "1"), and the above hop counts are transmitted as transmission values, respectively. Here, the DTP and DCP fields remain "0".

Figure 18D:
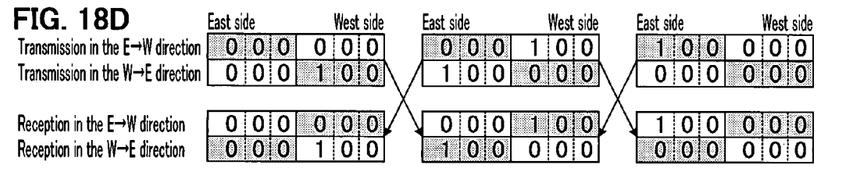
Figure 18E:
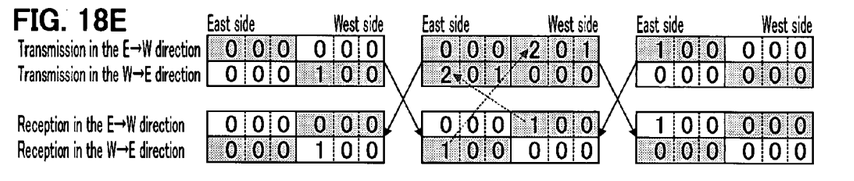

As shown in FIG. 18(d), the transmission values from node 1 and node 3 are respectively received on the E side and the W side of node 2. Using the reception value from node 1, node 2 recognizes that the optical signal is to be dropped at node 1 being located adjacent to the E side of node 2, and further, using the reception value from node 3, node 2 recognizes that the optical signal is to be dropped at node 3 being located adjacent to the W side of node 2. Therefore, at this stage, using the reception values shown in FIG. 18(*d*), node 2 recognizes that the path of node 2→node 1 exists on the E side thereof, and that the path of node 2→node 3 exists on the W side (because the hop counts in the data link reception values on both the E side and the W side are changed to other than "0"). Meanwhile, although node 1 recognizes the existence of the path of node 2→node 1, node 1 does not know the existence of the path of node 2→node 3. Also, although node 3 recognizes the existence of the path of node 2→node 3, node 3 does not know the existence of the path of node 2→node 1. In addition, neither node 1 nor node 3 knows that the present path setting is DTP. Meanwhile, accordingly, node 2 subsequently informs node 1 and node 3 that the path is a DTP connection path.

As shown in FIG. 18(*e*), after confirming that the hop counts in the data link reception value on the both sides (the E side and the W side) are other than "0", node 2 increments by 1 the hop count (in this case, "1") of the W side reception value (by this, the hop count is changed to "2"), so as to set as the hop count in the data link transmission value on the E side, and also, node 2 sets the DTP field to "1" (DCP remains "0"). Further, node 2 increments by 1 the hop count (in this case, "1") of the E side reception value (by this, the hop count is changed to "2"), so as to set as the hop count in the data link transmission value on the W side, and also, node 2 sets the DTP field to "1" (DCP remains "0"). Then, node 2 transmits the above transmission values.

As shown in FIG. 18(*f*), the transmission values from node 2 are respectively received on the E side of node 1 and on the W side of node 3. In node 1 and node 3, since the DTP value is "1", the path is recognized to be the DTP connection at this time point. Also, since the reception hop count in node 1 is "2", node 1 can know the existence of the path of node 2→node 3, in which node 3 being located two hops ahead on the E side functions as drop node. Then, node 1 recognizes the self-node as primary node, from the fact that the transmission value from node 2 has been received through the work channel, and by recognizing the DTP connection.

Figure 18F:
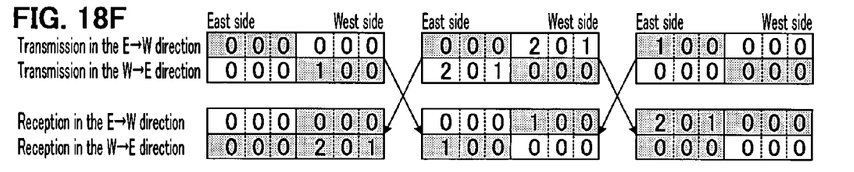

Similarly, since the reception hop count in node 3 is "2", node 3 can know the existence of the path of node 2→node 1, in which node 1 being located two hops ahead on the W side functions as drop node. Then, node 3 recognizes the self-node as secondary node, from the fact that the transmission value from node 2 has been received through the protection channel, and by recognizing the DTP connection.

In such a way as described above, by obtaining cross-connect information in regard to the DTP connection path, each node can automatically form the squelch table and the RIP table. Here, in case of the DTP connection, a source node ID registered in the squelch table is the ID of node 2, the terminal node, while a destination node ID is the ID of node 3, the secondary node. As described above, in the RIP table, there are stored the DCP/DTP type, the node ID of the terminal node, the node ID of the primary node, and the secondary node ID, and accordingly, it is possible to describe a path cross-connect state using the squelch table and the RIP table.

As described above, according to the present embodiment, DCP information and DTP information are buried in the transmission/reception values of a squelch data link, and therefore, by performing the processing according to the above-mentioned procedure, each node can know that a DCP/DTP path is being set, and which node functions as primary node, secondary node or terminal node, with ease and precision.

In the present invention, when generating a squelch table, hop counts counted from an add node or a drop node are used in place of a node ID of the own, as information of the add node, the drop node, etc. to be transmitted and received using a squelch data link. This makes it unnecessary to transmit and receive two information sets, a source node ID and a destination node ID, as conventionally required. By this, the number of bits available for identifying nodes can be expanded, enabling expansion of the number of nodes for which a squelch table can be formed automatically.

Also, because the connection form type (DCP and DTP) between rings is buried in the transmission and reception values of the squelch data link, each node can know that a DCP/DTP path is being set, and which node functions as primary node, secondary node or terminal node with ease and precision.

INDUSTRIAL APPLICABILITY

In optical transmission apparatus in a ring transmission system of BLSR (Bidirectional Line Switched Ring) structure, having a bidirectional transmission capability, the upper limit of the number of the optical transmission apparatus (nodes) installable in one ring can be expanded.

What is claimed is:

1. An optical transmission apparatus in a ring transmission system having a plurality of optical transmission apparatuses via a bidirectional optical transmission path connected in a ring shape, said plurality of optical transmission apparatuses including an add node, which is an optical transmission apparatus for adding an optical signal, and a drop node, which is an optical transmission apparatus for dropping the optical signal from said add node, said optical transmission apparatus comprising:

a storage unit to store an arrangement order information of the plurality of optical transmission apparatuses connected in the ring shape and identification information of each optical transmission apparatus;

a squelch data link processing unit to receive, from optical transmission apparatus being located adjacent to one side, a first hop count, which is the number of optical transmission apparatuses being existent between to the add node, and receive, from optical transmission apparatus being located adjacent to the other side, a second hop count, which is the number of optical transmission apparatuses being existent between to the drop node, by using a squelch data link; and a squelch table generation unit to obtain the identification information of the add node based on the arrangement order information and the received first hop count, obtain the identification information of the drop node based on the arrangement order information and the received second hop count, and generate the squelch table storing the identification information of the add node and the drop node;

wherein the squelch data link processing unit increments the received first hop count and transmits the incremented first hop count to the optical transmission apparatus being located adjacent to the other side, and also increments the received second hop count and transmits the incremented second hop count to the optical transmission apparatus being located adjacent to the one side.

2. An optical transmission apparatus in a ring transmission system having a plurality of optical transmission apparatuses via a bidirectional optical transmission path connected in a ring shape, said ring transmission system comprising a first ring system having an add node, which is an optical transmission apparatus for adding an optical signal, and a primary node and a secondary node, which are two optical transmission apparatuses for dropping the optical signal from the add node, and a second ring system connecting the primary node with the secondary node in a predetermined connection form, said optical transmission apparatus comprising:

a storage unit to store an arrangement order information of the plurality of optical transmission apparatuses connected in the ring shape and identification information of each optical transmission apparatus;

a squelch data link processing unit to receive, from optical transmission apparatus being located adjacent to one side, a first hop count, which is the number of optical transmission apparatuses being existent between to the add node, and from optical transmission apparatus being located adjacent to the other side, receive a second hop count, which is the number of optical transmission apparatuses being existent between to the secondary node, and from the adjacent optical transmission apparatus, receive a third hop count, which is the number of optical transmission apparatuses being existent between to the primary node, together with information for identifying the connection form type, by using a squelch data link;

a squelch table generation unit to obtain the identification information of the add node based on the arrangement order information and the received first hop count, obtain the identification information of the secondary node based on the arrangement order information and the received second hop count, and generate the squelch table storing the identification information of the add node and the secondary node; and a ring interworking on protection table generation unit to generate a ring interworking on protection table storing at least the connection form type and the identification information of the primary node;

wherein the squelch data link processing unit increments the received first hop count, the received second hop count and the received third hop count, and transmits the incremented first hop count, the incremented second hop count and the incremented third hop count to the optical transmission apparatus being located adjacent to the opposite side to the reception side.

3. The optical transmission apparatus according to claim 2, wherein the connection form is either a first form in which the optical signal from the add node is dropped at the primary node and transmitted to the second ring system, and also the optical signal is continued to be transmitted from the primary node to the secondary node, and dropped also at the secondary node and transmitted to the second ring system, or alternatively, a second form in which the optical signal from the add node is transmitted to one direction, and dropped at the primary node and transmitted to the second ring system, and also the optical signal from the add node is transmitted also to the other direction and dropped at the secondary node and transmitted to the second ring system.

4. The optical transmission apparatus according to claim 3, wherein the connection form is that the optical signal from the add node is transmitted to one direction, dropped at the primary node, and transmitted to the second ring system, and also the optical signal from the add node is also transmitted to the other direction, dropped at the secondary node, and transmitted to the second ring system.

5. An optical transmission apparatus in a ring transmission system having a plurality of optical transmission apparatuses via a bidirectional optical transmission path connected in a ring shape, said ring transmission system comprising a first ring system having an add node, which is an optical transmission apparatus for adding an optical signal, and a primary node and a secondary node which are two optical transmission apparatuses for dropping the optical signal from the add node, and a second ring system connecting the primary node with the secondary node in a predetermined connection form, said optical transmission apparatus comprising:

a storage unit to store an arrangement order information of the plurality of optical transmission apparatuses connected in the ring shape and identification information of each optical transmission apparatus;

a squelch data link processing unit to receive, from optical transmission apparatus being located adjacent to one side, a first hop count, which is the number of optical transmission apparatuses being existent between to the add node, and from optical transmission apparatus being located adjacent to the other side, receive a second hop count, which is the number of optical transmission apparatuses being existent between to either one of the primary node or the secondary node, and from the adjacent optical transmission apparatus, receive a third hop count, which is the number of optical transmission apparatuses being existent between to the remaining one of the primary node and the secondary node, together with information for identifying the connection form type, by using a squelch data link;

a squelch table generation unit to obtain the identification information of the add node based on the arrangement order information and the received first hop count, obtain the identification information of the secondary node based on the arrangement order information and the received second hop count, and generate the squelch table storing the identification information of the add node and the secondary node; and a ring interworking on protection table generation unit to generate a ring interworking on protection table storing at least the connection form type and the identification information of the primary node;

wherein the squelch data link processing unit increments the received first hop count, the received second hop count and the received third hop count, and transmits the incremented first hop count, the incremented second hop count and the incremented third hop count to the optical transmission apparatus being located adjacent to the opposite side to the reception side.

* * * * *